3,091,643
**PREPARATION OF ω-HYDROPOLYFLUOROPER-
HALO- AND POLYFLUOROPERHALOOLEFINS,
-KETONES, AND -CARBINOLS**
Douglas W. Wiley, Wilmington, Del., assignor to E. I. du
Pont de Nemours and Company, Wilmington, Del., a
corporation of Delaware
No Drawing. Filed Apr. 23, 1958, Ser. No. 730,266
20 Claims. (Cl. 260—595)

This invention relates to, and has as its primary object provision of, a new process for the preparation of polyfluoroketones, polyfluorocarbinols, and polyfluoroolefins.

Most known polyfluoroketones have been prepared by the Claisen condensation and various modifications thereof—see, for instance, Henne et al., J. Am. Chem. Soc. 69, 1819 (1947). These routes necessarily involve a multistep reaction since the Claisen condensation requires separate decarboxylation.

Some polyfluoroketones have been prepared by direct elemental fluorination of the corresponding hydrocarbyl ketone—see, for instance, Holub et al., J. Am. Chem. Soc. 72, 4879 (1950). This preparative route affords the polyfluoroketones in only relatively low yields and is obviously undesirable in requiring use of the extremely reactive, dangerous-to-handle, and quite toxic elemental fluorine.

Other polyfluoroketones and polyfluorocarbinols, generally in lesser amounts, have been reported as available from interaction of polyfluoro Grignard compounds or polyfluorohydrocarbylalkali metal compounds with polyfluoroacyl halides or esters. Again, however, such procedues are undesirable since generally relatively low yields are obtained, and the Grignard and alkali metal polyfluorohydrocarbyl compounds are difficult to prepare and require critical control of reaction conditions.

Perfluoro-4-heptanone has been reported as preparable from an alkyl ester of perfluoro-n-butyric acid and from one to two molar proportions of a free alkali metal—see U.S. 2,802,034. While the reaction affords the single ketone in relatively good yield and conversion, it suffers from the obvious disadvantage of not being a general synthesis and of requiring the frequently difficult-to-handle and sometimes dangerous free alkali metals.

The preparation of perfluoro-1- and -2-olefins by the pyrolysis of alkali metal salts of perfluorocarbyl carboxylic acids is well known—see, for instance, U.S. Patent 2,668,-864. However, the reaction requires appreciable temperatures, e.g., of the order of 250-300° C. At such temperatures because of the polymerizable nature of the products being formed, extremely carefully controlled conditions must be used and, even so, yields and conversions are not particularly good. Furthermore, mixtures of the 1- and 2-olefins are generally obtained, which mixtures are reasonably difficult to separate.

It has now surprisingly been found that polyfluoroperhalo- and ω-hydropolyfluoroperhaloketones, -carbinols, and -1-olefins, free of any of the 2-isomers, can be prepared directly in high yields by a simple substantially single step, lower temperature synthesis using readily available, easy-to-handle, and nontoxic intermediates. More specifically, it has been discovered that polyfluoroperhalo and ω-hydropolyfluoroperhaloketones can be prepared by reacting at least two molar proportions of an ester of, respectively, a polyfluoroperhalo- or an ω-hydropolyfluoroperhalocarboxylic acid with one molar proportion of an alkali metal alkoxide at moderate temperatures increasing with increasing molecular weight of the products but generally below 100° C. and preferably below 65° C.; acidifying the reaction mixture; and isolating the desired polyfluoroperhalo- or ω-hydropolyfluoroperhaloketone. The corresponding carbinols can be prepared from the ketones in the same temperature ranges by further reaction with the alkali metal alkoxide, again in a molar ratio, respectively, of 2:1 or higher, followed by similar acidification and isolation. The carbinols can also obviously be prepared directly from the polyfluoroester and alkali metal alkoxide in a molar ratio, respectively, of 4:3 followed by acidification and isolation.

The polyfluoroolefins are obtained from the same reactants under slightly different conditions in that the reaction is carried out at a higher temperature for any given carbon chain length and the final acidification is omitted. For the olefin synthesis, substantially equimolar proportions of the alkoxide and the polyfluorocarboxylate ester are required. However, the reaction can be carried out with excess proportions, as high as molar or even higher, of the fluorocarboxylate ester serving as a reaction medium, which excess remains unchanged during the synthesis and can be readily recovered by distillation. Since the olefin synthesis proceeds from the same reactants except at higher temperatures, there will frequently be obtained in both the ketone and carbinol syntheses some of the corresponding olefins as by-products, depending upon how high the reaction temperature is. With suitable temperature control, the syntheses can be effected to maintain such by-product olefin formation as low or as high as is desired. Generally speaking, when the synthesis is aimed at olefin production, the reaction temperatures will range from about 80 to about 150° C. or thereabouts at atmospheric pressure or frequently at reduced pressures.

While the invention is not to be so limited, it is believed that ketone and/or carbinol production, depending upon the molar ratios of the reactants charged, is favored by an increase in the reaction time, or more precisely by an increase in the total contact time of the reactants and the resultant intermediates. Accordingly, where olefin synthesis is desired, it is generally more efficient from both a conversion and yield standpoint if the olefin product is removed substantially as formed by direct distillation of such products from the reaction zone. Thus, olefin synthesis will generally be carried out as a continuous-type operation, with the product being trapped from the reaction zone as formed. An alternative and frequently more efficient method of effecting the reaction in such manner that olefin production is favored is to carry out the reaction under reduced pressure, i.e., with constant pumping, and to run the effluent gas stream through a series of efficient condensing traps which, because of the generally relatively low boiling points of the olefins especially under reduced pressure, will be cooled to temperatures substantially below zero, e.g., −70° C. or thereabouts, for a solid carbon dioxide coolant bath, ranging downwardly to liquid nitrogen temperatures. Conversely, if ketone or carbinol production is desired, the reaction will be preferably carried out in a closed reactor or in a reactor fitted with efficient condensing means for returning any fluorine containing products formed, possibly the olefins, to the reaction zone.

These processes and the products obtained thereby are illustrated in greater detail in the following reaction sequences which likewise show the probable mechanism of the synthesis, but such mechanism is not intended to be limitative:

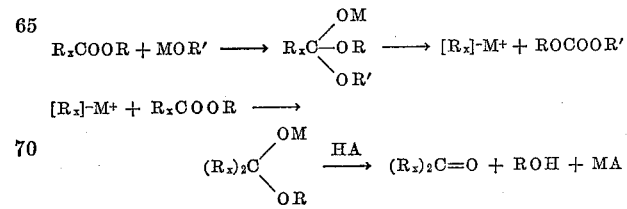

Overall this reduces to $$2R_xCOOR' + MOR' \xrightarrow{HA} (R_x)_2CO + ROCOOR' + ROH + MA$$

wherein: $R_x$ is used to represent a monovalent polyfluoroperhalocarbyl or ω-hydroperfluoroperhalocarbyl radical with at least two fluorine atoms or perfluorocarbon radicals on the α-carbon thereof, i.e., the carbon immediately linked to the carbonyl carbon in both the ester and ketone, and at least one fluorine atom on the β-carbon thereof, and preferably having at least two chain carbons; R and R', which can be alike or different, are used to represent any hydrocarbyl group generally of no more than eight carbons and preferably any alkyl group of no more than eight carbons, i.e., the lower alkyls; M is an alkali metal, preferably lithium, sodium, or potassium; and HA is an acid, especially a mineral acid.

The carbinol modification of this invention can be similarly represented schematically as follows:

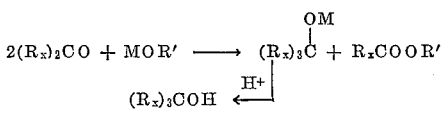

Or directly from the ester

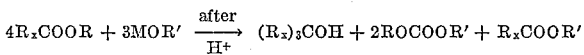

wherein $R_x$, R, and M have the same significance as just given above.

The olefin modification of this invention can be similarly represented schematically as follows:

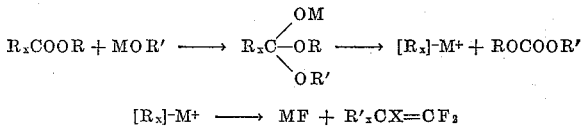

wherein $R'_xCFXCF_2^-$ is $R_x$, X is a halogen, and the other symbols have their previously indicated meanings. Overall this reduces to:

$$R_xCOOR' + MOR' \rightarrow ROCOOR' + MF + R'_xCX = CF_2$$

A particularly preferred class of polyfluoroperhalo- and ω-hydropolyfluoroperhaloketones, -carbinols, and -1-olefins to which the process of this invention is especially well adapted is illustrated in the following equations to which the foregoing general equations are generic:

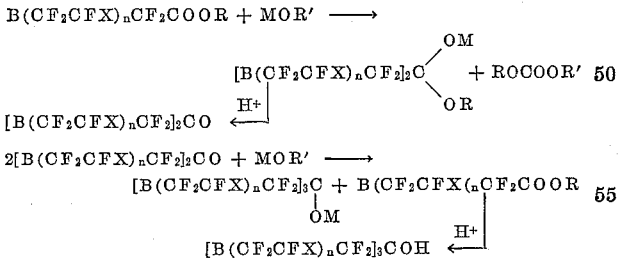

$$B(CF_2CFX)_nCF_2COOR + MOR' \longrightarrow$$
$$B(CF_2CFX)_{n-1}CF_2CX = CF_2 + MF + ROCOOR'$$

wherein B is used to represent hydrogen, halogen of atomic number no greater than 17, and perhalomethyl of total atomic weight no greater than 146.5, and the X's, which can be alike or different, are halogen of atomic number no greater than 17, n is an integer from 2–15, and R, R', and M have their previous significance. Of these particularly outstanding compounds, the ω-hydropolyfluoroperhaloketones and -carbinols are new compositions of matter per se, i.e., the products $$H(CF_2CFX)_nCF_2COCF_2(CFXCF_2)_nH$$

and , and are claimed in U.S. Pat. 3,029,252, issued April 10, 1962, to Howard E. Simmons, Jr.

The most preferred polyfluoroperhalo- and ω-hydropolyfluoroperhaloketones, -carbinols, and -olefins to which the process of this invention is especially well adapted are those where all the halogens are fluorine, as illustrated in the following equations to which the foregoing general equations are generic:

$$2D(CF_2CF_2)_mCOOR + MOR' \longrightarrow$$

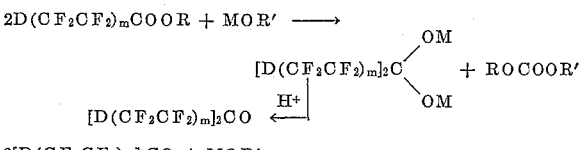

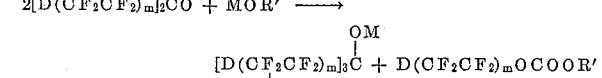

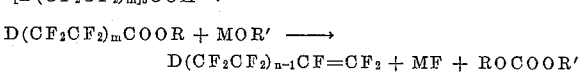

$$D(CF_2CF_2)_mCOOR + MOR' \longrightarrow$$
$$D(CF_2CF_2)_{n-1}CF = CF_2 + MF + ROCOOR'$$

wherein D is used to represent fluorine or hydrogen and m is an integer from one to seven, and preferably from one to five; R and R', which can be alike or different, and M have their previous meanings. Of these particularly outstanding compounds, the ω-hydroperfluoroketones and -carbinols are new compositions of matter per se, i.e., the products $H(CF_2CF_2)_nCO(CF_2CF_2)_nH$ and

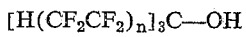

and are claimed in the abovementioned patent of Simmons, Jr.

These new ω-hydroperhalopolyfluoroketones and -carbinols of the latter two types, and most especially the latter perfluoro- and ω-hydroperfluorocarbyl ketones and carbinols, are outstandingly thermally-stable compounds ranging from high boiling liquids to solids, depending on the number of carbons therein. They distill without decomposition and possess most of the properties of the well-known stable fluorocarbons. However, these new ω-hydropolyfluoroperhaloketones and -carbinols exhibit one surprising difference in contrast to the unsubstituted perfluorocarbon compounds in that as a class they are readily soluble in organic solvents, such as ether, ethyl acetate, and methanol, and are readily recoverable therefrom unchanged; whereas, the corresponding polyfluorocarbon compounds are well known to be insoluble in such systems. The desirable combination of high solubility and extreme chemical stability thus makes this preferred class of compounds extremely useful.

The new processes and products of the present invention are illustrated more fully in the following detailed examples, wherein the parts given are by weight. These examples are merely illustrative and are not intended to be limitative of the invention.

*Example I*

To a suspension of 5.2 parts of sodium ethoxide in 35 parts of anhydrous diethyl ether was added over a thirty-minute period 48.4 parts (2 molar on the ethoxide) of ethyl perfluoro-m-butyrate. A gentle reflux occurred during the addition of the first half of the ester at room temperature. The resulting solution was allowed to stand for three days at room temperature under a dry nitrogen atmosphere and then was added with stirring to 200 parts of concentrated sulfuric acid. The volatile materials were distilled from the resultant reaction mixture at room temperature into a trap cooled in a solid carbon dioxide/acetone mixture. The liquid mixture thus collected was treated with three parts of phosphorus pentoxide and then fractionated by distillation. There was thus obtained 22.5 parts of crude perfluoro-4-heptanone as a clear, colorless liquid boiling at 72–76° C. at atmospheric pressure and 14.2 parts of recovered ethyl perfluoro-n-butyrate boiling at 95–96° C. The perfluoro-4-heptanone was further purified by an additional distillation through a precision fractionation column whereby there was obtained 20.4 parts (70% conversion and 88% yield) of pure perfluoro-4-heptanone as a clear, colorless liquid boiling at 75.5–76.2° C. at atmospheric pressure and exhibiting an infrared spectrum identical to that reported for perfluoro-4-heptanone by Henne—see J. Am. Chem. Soc. 75, 992 (1953).

The reaction was repeated varying only in that the reaction mixture was allowed to stand four days at room temperature. The volatile materials were then removed by distillation at room temperature into a trap cooled with a solid carbon dioxide/acetone bath under vacuum. The resultant liquid mixture was separated by distillation through a fractionation column into 4.2 parts of recovered ethyl perfluoro-n-butyrate boiling at 95° C. at atmospheric pressure and 7.8 parts of by-product diethyl carbonate boiling at 126° C. at atmospheric pressure; $n_D^{25}$, 1.3824. The nonvolatile solid residue remaining from the original distillation was treated with 10 parts of absolute sulfuric acid, and the resultant reaction mixture separated by fractionation through a precision distillation column. There was thus obtained 26.4 parts of pure perfluoro-4-heptanone boiling at 75–76° C. at atmospheric pressure and 5.4 additional parts of recovered ethyl perfluoro-n-butyrate boiling at 96° C. at atmospheric pressure. The total conversion to perfluoro-4-heptanone was thus 80% and the yield 90% of theory.

*Example II*

To a suspension of 11.2 parts of potassium t-butoxide in 53.0 parts of anhydrous diethyl ether was added over a four-minute period 54.4 parts (2 molar on the butoxide) of ethyl 5H-octafluorovalerate. A gentle reflux occurred during the addition of the first half of the ester at room temperature. The resulting reaction mixture was allowed to stand for ten days at room temperature under a dry nitrogen atmosphere and then was added with stirring to an excess of 2 N sulfuric acid. The resultant reaction mixture was extracted with 106 parts of diethyl ether. The ether extracts were concentrated by distillation of the diethyl ether therefrom. The resultant oily mixture of the organic reaction products was purified by distillation through a precision fractionation column whereby there was obtained 9.7 parts (55% of theory at 40% conversion) of 1,9 - dihydroperfluoro - 5 - nonanone, i.e., 1H,9H - hexadecafluoro-5-nonanone, as a clear, colorless liquid boiling at 69–78° C. at reduced pressures ranging from 60 to 52 mm. of mercury. The pure ketone boils at 147° C. at atmospheric pressure; $n_D^{25}$, 1.3092. The infrared and nuclear magnetic resonance spectra are consistent with the dihydrohexadecafluorononanone structure.

*Anal.*—Calcd. for $C_9H_2F_{16}O$: C, 25.1%; H, 0.5%; F, 70.7%. Found: C, 24.8%; H, 0.9%; F, 70.6%.

*Example III*

To a suspension of 9.0 parts of sodium methoxide in 35.0 parts of anhydrous diethyl ether was added over a 15-minute period 59.8 parts (2 molar on the methoxide) of ethyl 3H-tetrafluoropropionate. The resulting reaction mixture was allowed to stand for three days at room temperature under a dry nitrogen atmosphere and was then added with stirring to an excess of 2 N sulfuric acid. The organic reaction products were extracted from the reaction mixture using a continuous ether extractor. The ether was then removed from the extract by distillation, and the resultant oily mixture of the organic reaction products was purified by distillation through a precision fractionation column whereby there was obtained 4.8 parts (60% of theory at 20% conversion) of the hydrate of 1,5-dihydroperfluoro-3-pentanone, i.e., 1H,5H-octafluoro-3-pentanone, as a clear, colorless liquid boiling at 130–132° C. at atmospheric pressure; $n_D^{25}$, 1.3094. The infrared and nuclear magnetic resonance spectra were consistent with the dihydrooctafluoropentanone hydrate structure.

*Example IV*

To a solution of 47.2 parts of ethyl ω-hydroperfluorononanoate, i.e., ethyl 9H-octadecafluorononanoate, in 25 parts of anhydrous diethyl ether was added with stirring 2.8 parts (0.5 molar on the ester) of sodium methoxide. The resulting cloudy solution was heated on a steam bath to remove the diethyl ether. The last traces thereof were removed by pumping under reduced pressure, and the resulting thick reaction mixture was allowed to stand overnight at room temperature. The volatile products were then removed by heating on a steam bath under reduced pressure (12 mm. of mercury). There was thus obtained 3.9 parts of volatile liquid by-products, which were shown by infrared spectra to be a mixture of dimethyl, methyl, ethyl, and diethyl carbonates.

The nonvolatile, viscous, liquid residue was taken up in 35 parts of diethyl ether and five parts of concentrated sulfuric acid was added with stirring to the solution. The resultant precipitate of inorganic salts was removed by filtration, and the solid precipitate was washed well with 70 parts of diethyl ether. The ethereal filtrate and ether washings were combined and treated with about eight parts of phosphorus pentoxide. The solids were then removed by filtration, and the ethereal filtrate concentrated under reduced pressure by distilling off the diethyl ether. The remaining oily organic product was separated by fractionation in a short-path Hickman still under reduced pressure. A liquid product was collected at 60° C. under a pressure corresponding to 0.4 mm. of mercury and a sublimate at 90° C. under a pressure corresponding to 0.4 mm. of mercury.

The liquid distillate and the solid sublimate were combined, taken up in diethyl ether, and again dried over phosphorus pentoxide. The ether was removed by distillation under reduced pressure, and the remaining organic residue was purified by fractionation through a spinning band distillation column (U.S. Patent 2,712,-520). There was thus obtained 14 parts of recovered, mixed methyl and ethyl 9H-octadecafluorononanoates boiling at 91–100° C. under a pressure corresponding to 11 mm. of mercury and crude 1,17-dihydroperfluoro-9-heptadecanone as a clear, colorless liquid boiling at 143–148° C. under a pressure corresponding to 11 mm. of mercury and melting at 56–60° C. at atmospheric pressure. The crude ketone was redistilled through a short-path Hickman still with a steam-heated receiver to maintain liquid condition and then still further purified by sublimation at atmospheric pressure. There was thus obtained 14.2 parts (70% of theory at 58% conversion) of pure 1,17-dihydroperfluoro-9-heptadecanone, i.e., 1H, 17H-dotriacontafluoro-9-heptadecanone, as white needle crystals melting at 63–64° C.

*Anal.*—Calcd. for $C_{17}H_2F_{32}O$: C, 24.6%; H, 0.2%; F, 73.3%. Found: C, 24.5%; H, 0.8%; F, 73.0%.

The infrared spectrum of the pure ketone exhibited a relatively weak carbonyl absorption peak at 5.56 micron. The dihydroperfluoroheptadecanone is quite soluble in alcohols, ethyl acetate, and ethers but only sparingly soluble in cold chloroform and benzene. In solution in ethanol, the ketone forms an ethyl hemiketal which upon titration with sodium hydroxide indicates a neutral equivalent of 842 (theory, 830).

*Example V*

To a suspension of 5.2 parts of sodium methoxide in 70 parts of anhydrous diethyl ether was added 114.8 parts (2 molar on methoxide) of ethyl ω-hydroperfluoroundecanoate, i.e., ethyl 11H - eicosafluoroundecanoate. The resulting reaction mixture was refluxed under dry nitrogen for 140 hours with stirring and then was treated with 5.1 parts of concentrated sulfuric acid. The resulting precipitate of inorganic salts was removed by filtration and was carefully washed with 140 parts of ether. The ethereal filtrate and washings were combined and concentrated by distillation to remove the diethyl ether. The volatile reaction products were removed by distillation under reduced pressure into a trap cooled with a solid carbon dioxide/acetone bath. There was thus obtained six parts of by-product methyl and ethyl carbonates. The viscous liquid residue remaining after removal of the volatile materials solidified on standing, and there was thus obtained 25 parts of crude 1H,21H-tetracontafluoro-11-heneicosanone.

The crude ketone was converted to a dimethyl ketal by taking up in methanol and treating with 25 parts of dimethyl sulfate and 25 parts of potassium carbonate. The resulting reaction mixture was allowed to stand at room temperature for two hours and then poured into 500 parts of water. The organic reaction products were extracted from the mixture with 70 parts of diethyl ether. The ether was removed from the ether extract by distillation, and the resulting organic residue purified by distillation through a precision fractionation column. There was thus obtained 3.4 parts of recovered ethyl 11H-eicosafluoroundecanoate as a clear, colorless liquid boiling at 118° C. at a pressure corresponding to 9 mm. of mercury, and the dimethyl ketal of 1H,21H-tetracontafluoro-11-heneicosanone as a clear, colorless liquid boiling at 165° C. at a pressure corresponding to 0.1 mm. of mercury. The ketal on standing solidified to a waxy solid melting at 92–97° C. Sublimation and resublimation of the dimethyl ketal afforded the pure dimethyl ketal as white needles melting at 99–100° C. The infrared spectrum of the pure 1H,21H-tetracontafluoro-11,11-dimethoxyheneicosane was consistent with the ketal structure and showed no absorption in the carbonyl region.

Anal.—Calcd. for $C_{23}H_8F_{40}O_2$: C, 25.7%; H, 0.7%; F, 70.6%. M.W., 1076. Found: C, 26.0%, 26.1%; H, 1.0%, 0.9%; F, 70.2%, 70.4%, M.W., 935, 1010.

*Example VI*

To a suspension of 10.4 parts of sodium methoxide in 85 parts of anhydrous diethyl ether was added at room temperature with stirring 48.8 parts (equimolar on methoxide) of ethyl perfluoro-n-butyrate and 24.6 parts (0.5 molar on methoxide) of diethyl perfluorosuccinate. The resulting reaction mixture was allowed to stand for five days at room temperature under an atmosphere of dry nitrogen and then was treated with 10 parts (0.5 molar on alkoxide) of concentrated sulfuric acid. The resulting inorganic salt precipitate was removed by filtration, and the ethereal filtrate was concentrated by distillation of the diethyl ether therefrom under reduced pressure. The remaining liquid organic mixture was fractionated by distillation but the liquid distillate fractions were found to be mostly contaminated by codistilled carbonate ester by-products.

Accordingly, the fractions were combined and treated with 240 parts of sulfuric acid to remove the methyl and ethyl carbonate by-products. The volatile material from the sulfuric acid treatment was removed by pumping under vacuum into a trap cooled in a solid carbon dioxide/acetone bath. The liquid mixture thus obtained was purified by distillation through a spinning band fractionation column (U.S. Patent 2,712,520). There was thus obtained 13 parts (35% of theory) of perfluoro-4-heptanone as a clear, colorless liquid boiling at 75.5–77° C. at atmospheric pressure and 21.9 parts (60% of theory) of the mixed methyl and ethyl esters of 4-ketoperfluoroheptanoic acid boiling at 145–152° C. at atmospheric pressure; $n_D^{25}$, 1.3114–1.3142. The pure ethyl 4-ketoperfluoroheptanoate was obtained as a clear, colorless, sweet smelling oil boiling at 151–152° C. at atmospheric pressure; $n_D^{25}$, 1.3142.

Anal.—Calcd. for $C_9H_8F_{11}O_3$: C, 29.2%; H, 1.4%; F, 56.5%. N.E., 185. Found: C, 29.6%; H, 1.4%; F, 56.3%. N.E, 181, 184.

The infrared spectrum of the ethyl 4-ketoperfluoroheptanoate showed a doublet at 5.58 and 5.65 micron and was consistent with the ketoester structure. The nuclear magnetic resonance spectrum of the ethyl 4-ketoperfluoroheptanoate exhibited both hydrogen and fluorine resonance in agreement with the ketoester structure. The ethyl ketoester was cleaved readily by aqueous base to give 1H-heptafluoropropane and a mixture of 3H-tetrafluoropropionic, perfluorobutyric, and perfluorosuccinic acids as identified by infrared spectroscopy.

*Example VII*

To a suspension of 16.2 parts of sodium methoxide in 89 parts of tetrahydrofuran was added with stirring and cooling over a 15-minute period 114.2 parts (2 molar on methoxide) of ethyl perfluoropropionate. The resulting reaction mixture was stored at room temperature for seven days under a dry nitrogen atmosphere and was then added with stirring and cooling to 560 parts of sulfuric acid. The volatile materials were removed from the resulting reaction mixture by pumping under reduced pressure into a trap cooled in liquid nitrogen. The water-white liquid product thus obtained was purified by distillation through a precision fractionation column, whereby there was obtained 53 parts (67% of theory) of perfluoro-3-pentanone as a clear, colorless liquid boiling at 27° C. at atmospheric pressure. The infrared spectrum obtained on the vapor of the ketone showed the characteristic carbonyl absorption at 5.576 micron.

*Example VIII*

To 2.7 parts of anhydrous sodium methoxide suspended in 70 parts of diethyl ether, 36.6 parts (2 molar based on sodium methoxide) of perfluoro-4-heptanone was added with stirring and cooling in an ice bath. The resulting solution was stirred for 10 days at room temperature under an atmosphere of nitrogen. Concentrated sulfuric acid (5.3 parts) was added dropwise slowly with stirring and the mixture was then stirred for two more hours. The inorganic salts were removed by filtration and washed well with 70 parts of diethyl ether. The ethereal filtrate and washings were combined and concentrated to a low volume. The oily residue was shaken with 185 parts of concentrated sulfuric acid and the volatile products were separated from the reaction mixture by pumping under vacuum into a trap cooled in a mixture of solid carbon dioxide/acetone. The resulting mixture was separated by distillation through a spinning band fractionation column (U.S. Patent 2,712,520).

There was thus obtained 6.3 parts of methyl perfluorobutyrate as a clear, colorless liquid boiling at 79–82° C. at atmospheric pressure and 7.9 parts of tris(perfluoropropyl)carbinol as a clear, colorless liquid boiling at 112–116° C. at atmospheric pressure; $n_D^{25}$, 1.2910. Judd, Dissertation 1953, Purdue University, "Perfluoroalkyllithiums: Preparation and Reactions," reports B.P., 115–116° C.; $n_D^{20}$, 1.2903 for the carbinol. The infrared spectrum of the latter product, i.e., the carbinol, was consistent with that of the perfluorinated tertiary alcohol.

*Example IX*

To 52 parts of methyl 5H-octafluorovalerate in a glass reactor cooled in an ice/water bath was added with stirring 5.4 parts (0.5 molar based on the ester) of sodium methoxide. The reactor was connected to a trap cooled in a solid carbon dioxide/acetone bath to collect any volatile products. The slightly cloudy solution in the reactor was then heated slowly with stirring under reduced pressure corresponding to 200 mm. of mercury. An exothermic reaction started when the reaction mixture reached 80° C., with a rapid rise in temperature occuring to 92° C., accompanied by the evolution of a gaseous product. The reaction mixture was then heated for an additional 1.5 hours at 95–105° C. with pumping, leaving a solid residue (5.85 parts) in the reactor which partially dissolved in water and exhibited a strong positive test for fluoride ion. The trapped volatile material was fractionated through a spinning band distillation column (U.S. Patent 2,712,520) at atmospheric pressure.

There was thus obtained a liquid boiling below 38° C., 5.4 parts of dimethyl carbonate boiling at 88–92° C., and 33 parts of recovered starting ester, i.e., methyl 5H-octafluorovalerate, boiling at 132° C. On redistillation of the liquid fraction boiling below 38° C. there was thus obtained 6.2 parts of pure 4H-heptafluorobutene-1 as a clear, colorless liquid boiling at 27° C. at atmospheric pressure; $n_D^{25}$, less than 1.27. The yield of olefin, based on the starting ester not recovered, is 46% while the yield of recovered dimethyl carbonate is 82%. The infrared spectrum of the olefin was identical to that of an authentic sample of 4H-heptafluorobutene-1 as obtained from pyrolysis of sodium 5H-octafluorovalerate.

*Example X*

To 92 parts of methyl 9H-hexadecafluorononanoate was added with stirring and cooling 8.1 parts (0.75 molar on ester) of sodium methoxide. A trap cooled in a solid carbon dioxide/acetone bath was connected to the reactor and the reaction mixture was heated with stirring at a pressure corresponding to 25 mm. of mercury. At 90° C. a slow evolution of a volatile product was noted and the pot temperature was maintained at 110° C. for 1.5 hours while maintaining the reaction pressure at 25 mm. of mercury. A fresh trap was then inserted in the vacuum line and the pressure of the system was reduced to 0.1 mm. of mercury. The reactor was then heated at 130° C. until no further volatile material condensed in the trap. The remaining waxy pot residue (15.5 parts) was only partially soluble in water and exhibited a strong positive test for the fluoride ion. The more volatile liquid obtained in the first trap was fractionated by precision distillation to give three fractions:

(1) 9.2 parts of a clear, colorless liquid boiling at 88–90° C. at atmospheric pressure; $n_D^{25}$, 1.3540.

The infrared spectra and physical properties indicate this fraction is an about 1:1 by weight azeotrope of dimethyl carbonate ($n_D^{25}$, 1.3681) and 8H-pentadecafluorooctene-1.

(2) 15.1 parts of 8H-pentadecafluorooctene-1 as a clear, colorless liquid boiling at 118–122° C. at atmospheric pressure; $n_D^{25}$, 1.2950.

(3) 18.1 parts of recovered methyl 9H-hexadecafluorononanoate as a clear, colorless liquid boiling at 197–200° C. at atmospheric pressure; $n_D^{25}$, 1.3190.

Similar precision fractionation of the material obtained by pumping the reactor at 130° C., as above, afforded 27.8 parts of recovered methyl 9H-hexadecafluorononanoate as a clear, colorless liquid boiling at 95–96° C. under a pressure corresponding to 18 mm. of mercury; $n_D^{25}$, 1.3181. The total recovery of starting ester was thus 45.9 parts, from which it is calculated that the yield of olefin, based on the indicated 50% recovery of ester, was 51%.

*Example XI*

To 66.3 parts of ethyl perfluorooctanoate in a glass distillation pot was added with stirring 4.05 parts (0.5 molar based on ester) of sodium methoxide. The glass pot containing the resulting cloudy reaction mixture was then connected to a precision distillation column and heated under reduced pressure corresponding to 160 mm. of mercury. An exothermic reaction occurred when the pot temperature reached 80° C. with a consequent rise in pot temperature to 120° C. The reaction mixture was maintained at 115° C. while the volatile material was removed by distillation. The distillate temperature rose slowly to 52° C. at 160 mm. After one hour the pressure was lowered still further and excess ethyl perfluorooctanoate was removed by pumping.

The pot residue was swirled with about 75 parts of diethyl ether and the ethereal solution shaken with 2 N sulfuric acid. The resulting ethereal solution was dried over anhydrous magnesium sulfate and the diethyl ether solvent removed therefrom. The liquid residue was purified by distillation through a precision fractionation column. There was thus obtained 17 parts of mixed methyl and ethyl perfluorooctanoates boiling at 158–170° C.; $n_D^{25}$, 1.3095, and 4.3 parts of perfluoro-8-pentadecanone hydrate, i.e., triacontafluoro-8-pentadecanone hydrate, as a semisolid material boiling at 187–188° C. at atmospheric pressure. The infrared and nuclear magnetic resonance spectra of the ketone hydrate were entirely consistent with that structure.

The volatile material obtained by distillation from the reaction pot was shaken with concentrated sulfuric acid to remove the alkyl carbonates and redistilled through a precision fractionation column. There was thus obtained 8.9 parts of perfluoroheptene-1 as a clear, colorless liquid boiling at 79–84° C. at atmospheric pressure, $n_D^{25}$, less than 1.27, and 21 parts of mixed methyl and ethyl perfluorooctanoates. The total recovery of the esters is thus 38 parts, from which it is calculated that the yield of olefin is about 40%. The infrared spectrum of the olefin is identical with that shown for the compound as the fourth entry in Fig. 10 at page 478 of "Fluorine Chemistry—Vol. II," edited by J. H. Simons, Academic Press, 1954.

The synthesis reaction is preferably carried out in the presence of an inert liquid reaction medium. A particularly outstanding and convenient medium for ketone and carbinol synthesis is anhydrous diethyl ether. Reaction time in this medium at temperatures ranging from room temperature (or about 20° C.) to the reflux of ether (about 35° C.) preferably is of the order of magnitude of four to five days. However, using other reaction media, the reaction temperature can be raised and reaction time will accordingly be lower. Higher boiling reaction media with concomitant higher possible reaction temperatures are preferred for the longer chain products, and especially for olefin synthesis where such higher temperatures are both needed and preferred, e.g., dibutyl ether, diethyl carbitol, diethyl carbonates. Suitable reaction media will be found among those organic materials which are sufficiently polar for use as reaction media in the well-known Grignard reaction, such as di-n-butyl ether, tetrahydrofuran, and the like. The reaction can also be carried out with essentially equivalent efficiency, especially for olefin synthesis, using excess proportions of the perhalopolyfluoro- and ω-hydroperhalopolyfluoro-carboxylates as solvent media.

The reaction for ketone and carbinol production is most usually carried out as a batch process using conventional chemical pots or autoclaves. Olefin synthesis will usually be effected with continuous removal of olefin as formed, e.g., by distillation, frequently at reduced pressure, with the same type reactors. The reactor however used should be equipped with suitable means for protecting the reaction system from moisture in any form. The reaction times, as is true of all chemical syntheses, will vary as a function of the reaction temperature. The latter likewise will vary with the nature of the specific ω-hydroperhalopolyfluoro- or perhalopolyfluoroketone, carbinol, or olefin being synthesized. Thus, for the shorter chain ketones, the reaction temperature will be substantially below 100° C. and preferably will be no higher than 50–60° C. Under these conditions for the preparation of the short chain ketones, the reaction times will vary from about four days or so at room temperature to roughly one day at 50–60° C.

In the case of the longer chain ketones, i.e., those where the $R_x$'s of the preceding formulas each contain eight to twelve chain carbons or more, the reaction temperatures will be slightly higher to give an equivalent yield in the same time or else the reaction times will be markedly increased. Even in the case of such higher molecular weight ketones, however, the reaction temperature will preferably not exceed about 80–100° C. Carbinol synthesis will be effected in about the same temperature ranges varying likewise with the length of the carbon chain and generally slightly higher than for the ketones.

Olefin synthesis will be effected at higher temperatures, again varying upwardly with increasing carbon chain length but generally not above about 100–130° C. up to about 150° C. Operating at reduced pressures will, of course, lower the reaction temperatures.

The process of the present invention is of particular significance when applied to the preparation of the perfluoro- and ω-hydroperfluoroketones, -carbinols, and -olefins, since these compounds exhibit outstanding chemical properties. A particularly preferred class of these compounds are the perfluoro- and ω-hydroperfluoroketones, -carbinols, and -olefins in which the perfluoro or ω-hydroperfluoro radicals, alike or different, attached, respectively, to the carbonyl carbon, to the carbinol carbon, or to the perfluorovinyl group, —CF=CF$_2$, contain an even number of carbons, and especially those wherein such radicals contain no more than fourteen carbons in each such radical. Thus, this preferred embodiment of the present invention can be represented by the following reactions for the ketones:

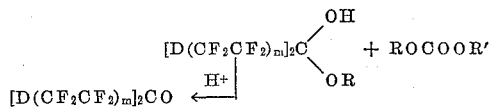

for the carbinols:

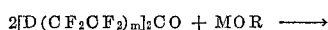
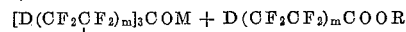
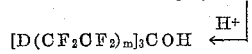

and for the 1-olefins:

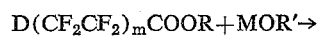

$$D(CF_2CF_2)_mCOOR + MOR' \rightarrow$$
$$D(CF_2CF_2)_{m-1}CF=CF_2 + MF + ROCOOR'$$

wherein $m$ is used to represent an integer of from one to seven; D is used to represent hydrogen or fluorine; and M, R, and R' have their previously indicated significance.

In addition to the foregoing detailed disclosures, the following specific examples of the process of the present invention are submitted to further illustrate the invention. Thus, using the above outlined process steps with other specific compounds of the types aforesaid described, there are obtained additional further polyfluoroketones, -carbinols, and 1-olefins. For example, using two molar proportions of ethyl 13H-tetracosafluorotridecanoate and one molar proportion of lithium octyloxide, there is obtained bis(12H-tetracosafluorododecyl) ketone, i.e., 1H,25H-octatetracontafluoro-13-pentacosanone. From methyl perfluoroisobutyrate (two molar proportions) and one molar proportion of sodium methoxide, there is obtained bis(perfluoroisopropyl)ketone, i.e., perfluoro-2,4-dimethyl-3-pentanone.

Further, from one molar proportion of isobutyl perfluorooctanoate and one molar proportion of lithium ethylate, there is obtained bis(perfluoroheptyl)ketone, i.e., perfluoro-8-pentadecanone. From two molar proportions of hexyl 7H-dodecafluoroheptanoate and one molar proportion of sodium isopropoxide, there is obtained bis(6H-dodecafluorohexyl) ketone, i.e., 1H,13H-tetracosafluoro-7-tridecanone. From two molar proportions of propyl chloro-2,2,3,3-tetrafluoropropionate and one molar proportion of sodium isobutoxide, there is obtained bis(chloro-1,1,2,2-tetrafluoroethyl) ketone, i.e., 1,5-dichloro-1,1,2,2,4,4,5,5-octafluoro-3-pentanone. From two molar proportions of butyl perfluoroisovalerate and one molar proportion of sodium butoxide, there is obtained bis(perfluoroisobutyl) ketone, or more precisely, 1,1,1,2,3,3,5,5,6,7,7,7-dodecafluoro-2,6-bis-(trifluoromethyl)-4-heptanone. From two molar proportions of ethyl perfluorocyclohexanecarboxylate and one molar proportion of potassium methoxide, there is obtained bis(perfluorocyclohexyl) ketone.

In its olefin aspect, the process of this invention can be similarly further illustrated with the following specific examples in addition to those given in full detail in the foregoing. Thus, using the above-outlined process steps with other specific polyfluoro- and ω-hydropolyfluoroperhalocarboxylate esters and alkali metal alkoxides, there are obtained additional polyfluoro-1-olefins. In each instance, the olefin formed will be one carbon less in chain length than the acyl moiety of the ester, and in forming the olefin linkage the β-carbon of the acyl moiety will lose a fluorine atom. For example, using one molar proportion of ethyl 13H-tetracosafluorotridecanoate and one molar proportion of lithium octyl oxide, there is obtained 12H-tricosafluorododecene-1. From methyl perfluoroisobutyrate and an equimolar proportion of sodium methoxide, there is obtained perfluoropropylene. From isobutyl perfluorooctanoate and an equimolar proportion of lithium ethylate, there is obtained perfluoroheptene-1. From hexyl 7H-dodecafluoroheptanoate and an equimolar proportion of sodium isopropoxide, there is obtained 6H-undecafluorohexene-1. From propyl 3-chloro-2,2,3,3-tetrafluoropropionate and an equimolar proportion of sodium isobutoxide, there is obtained chlorotrifluoroethylene. From butyl perfluoroisovalerate there is obtained perfluoroisobutylene. From ethyl perfluorocyclohexenecarboxylate and an equimolar proportion of potassium methoxide, there is obtained perfluorocyclohexane. From pentyl perfluoropropionate and an equimolar proportion of sodium propoxide, there is obtained tetrafluoroethylene. From heptyl 11-chloroeicosafluoroundecanoate there is obtained 10-chlorononadecafluorodecene-1.

Mixtures of the polyfluoroperhalo- and ω-hydropolyfluoroperhalocarboxylate esters, as well as mixtures of the alkali metal alkoxides, can be used. In the case of the former, a mixture of products will be obtained comprising the two symmetrical ketones and the unsymmetrical ketone. Mixtures of the alkoxides have no effect on the nature of the ketone product. Thus, one molar proportion of methyl perfluoroisobutyrate and one molar proportion of pentyl 3-chloro-2,2,3,3-tetrafluoropropionate and one molar proportion of sodium propoxide affords a mixture of bis(perfluoroisopropyl) ketone, bis(2-chloro-1,1,2,2-tetrafluoroethyl) ketone, and 2-chloro-1,1,2,2-tetrafluoroethyl perfluoroisopropyl ketone, i.e., 1-chloro-2,2,3,3,5,6,6,6-octafluoro-4-trifluoromethyl-3-pentanone. From one molar proportion of heptyl 11-chloroeicosafluoroundecanoate, one molar proportion of isobutyl perfluorooctanoate, and one molar proportion of rubidium methoxide, there is obtained perfluoroheptyl 10-chloroeicosafluorodecyl ketone, i.e., 18-chloropentatriacontafluoro-8-octadecanone in admixture with bis(perfluoroheptyl) ketone and bis(10-chloroeicosafluorodecyl) ketone. In the olefin aspects, the process is likewise operable with mixtures of the fluorocarboxylate esters as well as mixtures of the alkali metal alkoxides. As in the ketone and carbinol syntheses, mixtures of the alkoxides have no effect on the products obtained. However, contrary to the ketone and carbinol processes, mixtures of the polyfluorocarboxylate esters do not have as profound an effect on the products since all that are obtained are olefins from each fluorocarboxylate moiety rather than, as with the ketones and carbinols, cross products.

As illustrated in the foregoing detailed examples, the invention in its process aspects, is not limited to the use of esters of polyfluoroperhalo- and ω-hydropolyfluoroperhalomonocarboxylic acids, but also is inclusive of such esters of the polycarboxylic acids. Depending on the reaction conditions involved and in particular on the relative molar proportions of the reactants used, several different types of products can be obtained from the polyfluoroperhalo- and ω-hydropolyfluoroperhalopolycarboxylic acid esters. Generally speaking, the esters of the polycarboxylic acids will not be used as sole reactants, but will be used in conjunction with one or more of the esters of the polyfluoroperhalo- and ω-hydropoylfluoroperhalomonocarboxylic acids. Taking the esters of the polyfluoroperhalodicarboxylic acids as illustrative, there can be obtained mostly the symmetrical diketones by reaction with two molar proportions of a polyfluoroperhalo- or ω-hydropolyfluoroperhalomonocarboxylic acid ester along with two molar proportions of the necessary alkali metal alkoxide. On the other hand, if equimolar proportions of a polyfluoroperhalodicarboxylic acid ester and a polyfluoroperhalo- or ω-hydropolyfluoroperhalomonocarboxylic acid ester are reacted in the presence of one molar proportion of the alkali metal alkoxide, then mostly a β-keto-ester is obtained, along with the symmetrical mono- and diketones. Conversely, if one molar proportion each of two different polyfluoroperhalo- or ω-hydropolyfluoroperhalomonocarboxylic acid esters are reacted with one molar proportion of a polyfluoroperhalodicarboxylic acid diester in the presence of two molar proportions of the requisite alkali metal alkoxide, then several products are obtained, including the unsymmetrical diketone, the two symmetrical diketones from the monocarboxylic acid esters, the unsymmetrical diketones from the two monocarboxylic acid esters, and possibly in some instances the γ-ketoesters from the dibasic ester and one of each of the two monobasic esters.

To illustrate more specifically, when one molar proportion of dimethyl perfluoroadipate is reacted with two molar proportions of ethyl perfluoropropionate and two molar proportions of sodium methoxide, there are obtained the symmetrical diketones, i.e., mostly perfluoro-3-pentanone and to a lesser extent perfluoro-3,8-decandione, as well as the ketoester, methyl perfluoro-6-ketooctanoate. On the other hand, when one molar proportion of dihexyl difluoromalonate is reacted with one molar proportion of 2-chloroethyl 3-chlorotetrafluoropropionate and one molar proportion of lithium ethoxide, an equilibrium mixture is obtained of the ketoester, i.e., hexyl 5-chloro-2,2,4,4,5,5-hexafluoro-3-ketopentanoate, as well as the symmetrical ketone 1,5-dichloroperfluoro-3-pentanone and the symmetrical diketone 1,7-dichloroperfluoro - 3,5 - heptandione. Similarly, if one molar proportion of ethyl methyl perfluoroglutarate is reacted with one molar proportion of ethyl perfluoropropionate and one molar proportion of methyl 7H-dodecafluoroheptanoate in the presence of two molar proportions of lithium methoxide, a mixture of several products is obtained, including the unsymmetrical diketone, i.e., 1-hydroperfluoro-7,11-tetradecanedione, as well as the symmetrical ketones, perfluoro-4-heptanone, and 1H,13H-pentacosafluoro-7-tridecanone as well as the simple unsymmetrical ketone, i.e., 1H-dodecafluorohexyl perfluoropropyl ketone, and the mixed keto esters.

As is the case with the ketone and carbinol syntheses, the olefin process is not limited to the use of the polyfluoro esters of monocarboxylic acids but also is inclusive of such esters of the polycarboxylic acids. Depending upon the molar ratios of the polyfluoropolycarboxylic acid esters and the alkali metal alkoxides, one or all of the carboxylate ester moieties may be converted into the adipate and one molar proportion of sodium methoxide, there is obtained methyl perfluoro-4-pentenoate; whereas, using dimethylperfluoro adipate and two molar proportions of sodium methoxide, there is obtained perfluoro-1,3-butadiene.

The polyfluoroketones and -carbinols are particularly outstanding because of their extreme chemical and physical stability. This is especially true of the perfluoro- and ω-hydroperfluoroketones and -carbinols. These products are insensitive to aqueous acids and, in fact, are stable to such strong acid conditions as concentrated sulfuric acid. The compounds show no reaction with various metals either in solvents or to the metal alone, including exposure at elevated temperatures.

The new polyfluoroperhalocarbyl- and ω-hydropolyfluoroperhalocarbyl ketones and carbinols, not only exhibit good chemical stability, but are also outstandingly resistant against thermal and oxidative degradation. Furthermore, they possess sufficiently high boiling points so as to make them of utility in certain so-called "stable liquid" outlets, e.g., as transformer fluids, as fluids for high-temperature power transmission or hydraulic systems, or for use in liquid coupled mechanical drives and the like where a particularly high degree of oxidative and hydrolytic stability is needed at elevated temperatures. These compounds are likewise outstandingly useful as heat transfer media, particularly in closed systems operating at relatively high temperatures such as found, for instance, in modern high-pressure high-temperature power generating equipment.

The ketones also are elegant chemical intermediates, for instance, as the raw materials for making the even more stable, both chemically and physically, acyclic and cyclic polyfluoroperhalo- and ω-hydropolyfluoroperhaloketals—see the above-mentioned U.S. Patent 3,029,252 of Simmons, Jr.

With respect to this important use as "stable liquids," the most important ketones and carbinols, particularly the former, are found in two classes of the compounds of the present invention, viz., the perfluoro- and ω-hydroperfluoroketones. The perfluoroketones, particularly those from ten to thirty carbons in the chain or thereabouts, are the most stable chemical and physically. The other important class, i.e., the ω-hydroperfluoroketones, again of carbon chain content ranging from about seven to about twenty and especially in the range of about ten to fifteen chain carbons, are especially outstanding because of their markedly higher boiling points.

It is quite surprising that the difference between the perfluoroketones and the ω-hydroperfluoroketones, viz., the single terminal hydrogen in each radical pendent on the ketone carbonyl, affords such a significant difference in the physical properties of the compounds. The boiling point difference in otherwise identical compounds is as high as 50–70° C. in terms of boiling point at atmospheric pressure. Thus, perfluoro-3-pentanone boils at 27° C. at atmospheric pressure; whereas, 1H,5H-octafluoro-3-pentanone boils at 73° C. at atmospheric pressure. Similarly, perfluoro-4-heptanone boils at 76° C. at atmospheric pressure; whereas 1H,9H-hexadecafluoro-5-nonanone boils at 147° C. at atmospheric pressure. The longer chain ω-hydroperfluoroketones, i.e., longer than about twenty chain carbons, are normally solids at room temperature and, as such, are not normally thought of as useful stable liquids. However, for those system which usually operate at elevated temperatures, these materials behave as perfectly suitable liquids for the usual heat transfer or power transmission needs.

Another surprising difference in physical properties between the ω-hydroperfluoro- and the perfluoroketones is the increase in the refractive indices thereof afforded by the presence of the single terminal hydrogen, such refractive indices differing by as much as 0.20 unit under normal conditions. Thus, perfluoro-3-pentanone exhibits an $n_D^{25}$ too low to be read on a conventional refractometer; whereas, 1H,5H-octafluoro-3-pentanone exhibits an $n_D^{25}$ of 1.3094. Similarly, perfluoro-4-heptanone exhibits an $n_D^{25}$ too low to be measured on a conventional refractometer (but estimated at 1.2680); whereas, 1H,9H-hexadecafluoro-5-nonanone exhibits an $n_D^{25}$ of 1.3092.

Finally, the perfluorinated ketones are only soluble to a limited extent in organic solvents; whereas, the ω-hydroperfluoroketones are much more soluble, thereby making them of obviously greater utility as carriers or solvents in organic reaction systems. Thus, perfluoro-4-heptanone is soluble only to a relatively low extent under normal conditions in such conventional organic media as acetone and dimethyl sulfoxide. On the other hand, the corresponding ω-hydroperfluoroketone, i.e., 1H,9H-hexadecafluoro-5-nonanone, is completely miscible in these same media under normal conditions.

Since obvious modifications of the invention will be apparent to those skilled in the art, I propose to be bound solely by the appended claims.

The embodiments of the invention in which an exclusive property or privilege is claimed are defined as follows:

1. The process of preparing a polyfluoro-1-olefin which comprises reacting, at a temperature of from about 80 to about 150° C. and at a pressure up to about one atmosphere, a one molar proportion of an alkali metal alkoxide in suspension in an inert liquid with at least a one molar proportion of a lower alkyl ester of at least one acid from the group consisting of polyfluoroperhalocarboxylic and omega-hydropolyfluoroperhalocarboxylic acids, wherein the halo substituents are of atomic number 9–17 and wherein the radical attached directly to the carboxyl carbon has at least two chain carbons, the alpha carbon of which carries at least two members from the group consisting of fluorine and perfluorocarbon radicals and the beta carbon of which carries at least one fluorine radical.

2. The process of claim 1 wherein the polyfluoro-1-olefin is removed from the reaction mixture as it is formed.

3. The process of claim 1 wherein the alkali metal is a member of the group consisting of lithium, sodium and potassium.

4. The process of claim 1 wherein the polyfluoro-1-olefin contins no more than 14 carbons.

5. The process of preparing 4H-heptafluorobutene-1 which comprises reacting an alkoxide of an alkali metal in suspension in a liquid with a lower alkyl ester of 5H-octafluorovaleric acid at a temperature of about 80–150° C. and at a pressure up to about one atmosphere, and isolating the fluoroolefin thus produced by condensation at reduced temperatures.

6. The process of preparing 8H-pentadecafluorooctene-1 which comprises reacting an alkoxide of an alkali metal in suspension in a liquid with a lower alkyl ester of 9H-hexadecafluorononanoic acid at a temperature of about 80–150° C. and at a pressure up to about one atmosphere, and isolating the fluoroolefin thus produced by condensation at reduced temperatures.

7. The process of preparing perfluoroheptene-1 which comprises reacting an alkoxide of an alkali metal in suspension in a liquid with a lower alkyl ester of perfluorooctanoic acid at a temperature of about 80–150° C. and at a pressure up to about one atmosphere, and isolating the fluoroolefin thus produced by condensation at reduced temperatures.

8. The process of preparing polyfluoroketones which comprises reacting, at a temperature between about 20 and 100° C., a one molar proportion of an alkali metal alkoxide in suspension in an inert liquid with at least a two molar proportion of a lower alkyl ester of at least one acid from the group consisting of polyfluoroperhalocarboxylic and omega-hydropolyfluoroperhalocarboxylic acids, wherein the halo substituents are of atomic number 9–17 and wherein the radical attached directly to the carboxyl carbon has at least two chain carbons, the alpha carbon of which carries at least two members from the group consisting of fluorine and perfluorocarbon radicals and the beta carbon of which carries at least one fluorine radical, and acidifying the reaction product with a mineral acid.

9. The process of claim 8 wherein the alkali metal is a member from the group consisting of lithium, sodium, and potassium.

10. The process of claim 8 wherein the carbon-chain radicals of the alkoxide and the carboxylic acid and alcohol moieties of the esters contain no more than 13 carbons each.

11. The process of preparing perfluoro-4-heptanone which comprises reacting a lower alkyl ester of perfluoro-n-butyric acid with an alkoxide of an alkali metal in suspension in a liquid at about 20–65° C. and acidifying the reaction mixture with a mineral acid.

12. The process of preparing 1H,9H-hexadecafluoro-5-nonanone which comprises reacting a lower alkyl ester of 5H-octafluorovaleric acid with an alkoxide of an alkali metal in suspension in a liquid at about 20–65° C. and acidifying the reaction mixture with a mineral acid.

13. The process of preparing 1H,5H-octafluoro-3-pentanone which comprises reacting a lower alkyl ester of 3H-tetrafluoropropionic acid with an alkoxide of an alkali metal in suspension in a liquid at about 20–65° C. and acidifying the reaction mixture with a mineral acid.

14. The process of preparing 1H,17H-dotriacontafluoro-9-heptadecanone which comprises reacting an alkoxide of an alkali metal in suspension in an inert liquid with a lower alkyl ester of 9H-octadecafluorononanoic acid at a temperature between about 20 and 100° C. and acidifying the reaction product with a mineral acid.

15. The process of preparing perfluoro-3-pentanone which comprises reacting an alkoxide of an alkali metal in suspension in an inert liquid with a lower alkyl ester of perfluoropropionic acid at a temperature between about 20 and 100° C. and acidifying the reaction product with a mineral acid.

16. The process of preparing polyfluorocarbinols which comprises reacting, at a temperature between about 20 and 100° C., a one molar proportion of an alkali metal alkoxide in suspension in an inert liquid with at least a two molar proportion of at least one member of the group consisting of polyfluoroperhaloloweralkyl and omega-hydropolyfluoroperhaloloweralkyl ketones wherein the halo substituents are of atomic number 9–17 and wherein the radicals attached directly to the carbonyl carbon have at least two chain carbons, each alpha carbon of which carries at least two members from the group consisting of fluorine and perfluorocarbon radicals and each beta carbon of which carries at least one fluorine radical, and acidifying the reaction product with a mineral acid.

17. The process of claim 16 wherein the alkali metal is a member from the group consisting of lithium, sodium, and potassium.

18. The process of claim 16 wherein the carbon-chain radicals of the alkoxide and the carboxylic acid and alcohol moieties of the esters contain no more than 13 carbons each.

19. The method of preparing tris(perfluoropropyl)carbinol which comprises reacting an alkoxide of an alkali metal with perfluoro-4-heptanone in an inert liquid and acidifying the reaction mixture with a mineral acid.

20. The method of preparing tris(perfluoropropyl)carbinol which comprises reacting sodium methoxide with perfluoro-4-heptanone in ether and acidifying the reaction mixture with a mineral acid.

References Cited in the file of this patent

UNITED STATES PATENTS

| | | |
|---|---|---|
| 2,802,034 | Heuptschein | Aug. 6, 1957 |
| 2,824,139 | Barnhart et al. | Feb. 18, 1958 |
| 2,824,897 | Wujciak et al. | Feb. 25, 1958 |

FOREIGN PATENTS

| | | |
|---|---|---|
| 687,685 | Great Britain | Feb. 18, 1953 |

OTHER REFERENCES

Henne et al.: J. Am. Chem. Soc., vol. 69, pp. 1819–20 (1947)

McBee et al.: J. Am. Chem. Soc., vol. 75, pp. 3152–3 (1953).